(12) United States Patent
Nishida et al.

(10) Patent No.: US 11,492,962 B2
(45) Date of Patent: Nov. 8, 2022

(54) POWER GENERATION DEVICE AND AUTOMOBILE

(71) Applicants: HIROSHIMA UNIVERSITY, Hiroshima (JP); HONDA MOTOR CO., LTD., Tokyo (JP)

(72) Inventors: Keiya Nishida, Hiroshima (JP); Koichi Hatamura, Hiroshima (JP)

(73) Assignees: HIROSHIMA UNIVERSITY, Hiroshima (JP); HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 16/961,194

(22) PCT Filed: Jan. 9, 2019

(86) PCT No.: PCT/JP2019/000413
§ 371 (c)(1),
(2) Date: Jul. 9, 2020

(87) PCT Pub. No.: WO2019/139056
PCT Pub. Date: Jul. 18, 2019

(65) Prior Publication Data
US 2021/0054781 A1 Feb. 25, 2021

(30) Foreign Application Priority Data
Jan. 15, 2018 (JP) .............................. JP2018-004534

(51) Int. Cl.
*F02B 75/28* (2006.01)
*B60K 6/26* (2007.10)
(Continued)

(52) U.S. Cl.
CPC .............. *F02B 75/28* (2013.01); *B60K 6/26* (2013.01); *B60K 6/46* (2013.01); *B60L 2240/421* (2013.01); *B60W 20/17* (2016.01)

(58) Field of Classification Search
CPC .................................. B60K 6/26; F02B 75/28
See application file for complete search history.

(56) References Cited

U.S. PATENT DOCUMENTS

| 4,856,463 A * | 8/1989 | Johnston ................. F02B 41/04 123/41.73 |
| 2005/0274332 A1 | 12/2005 | Lemke |

(Continued)

FOREIGN PATENT DOCUMENTS

| CN | 101258304 A | 9/2008 |
| CN | 101427012 A | 5/2009 |

(Continued)

OTHER PUBLICATIONS

"Components_Leading Innovations_the Zero Vibration Engine", [online], OBRIST Powertrain GmbH, URL: http://www.obrist-powertrain.com/components/ 12 pages, 2019.
(Continued)

*Primary Examiner* — Kevin A Lathers
(74) *Attorney, Agent, or Firm* — Casimir Jones, S.C.; Brian F. Bradley (57) ABSTRACT

The present invention provides a power generation device that can not only reduce the generation of vibration but also increase thermal efficiency. A power generation device (10A) includes: an engine (1) in which a right crankshaft (31) and a left crankshaft (32) rotate in opposite directions to each other; a right flywheel (41) and left flywheel (42) as a primary inertia body; and a power generation motor (2) as a secondary inertia body, a total inertia moment in a first rotation direction and a total inertia moment in a second rotation direction being balanced with each other by not less than 50%.

8 Claims, 6 Drawing Sheets

(51) Int. Cl.
*B60W 20/17* (2016.01)
*B60K 6/46* (2007.10)

(56) References Cited

U.S. PATENT DOCUMENTS

| | | |
|---|---|---|
| 2007/0022983 A1 | 2/2007 | Reisser |
| 2008/0047530 A1 | 2/2008 | Cleeves |
| 2008/0223342 A1 | 9/2008 | Angstrom |
| 2009/0266329 A1 | 10/2009 | Cleeves |
| 2009/0266339 A1 | 10/2009 | Cleeves |
| 2010/0147269 A1 | 6/2010 | Flowers |
| 2010/0212622 A1 | 8/2010 | Cleeves |
| 2011/0041799 A1 | 2/2011 | Cleeves |
| 2011/0220058 A1 | 9/2011 | Cleeves |
| 2012/0085302 A1 | 4/2012 | Cleeves |
| 2012/0085305 A1 | 4/2012 | Cleeves |
| 2012/0085309 A1 | 4/2012 | Cleeves |
| 2012/0085314 A1 | 4/2012 | Cleeves |
| 2012/0085319 A1 | 4/2012 | Cleeves |
| 2012/0089316 A1 | 4/2012 | Cleeves |
| 2012/0090298 A1 | 4/2012 | Cleeves |
| 2012/0111293 A1 | 5/2012 | Cleeves |
| 2012/0158273 A1 | 6/2012 | Cleeves |
| 2012/0330534 A1 | 12/2012 | Cleeves |
| 2013/0146013 A1 | 6/2013 | Cleeves |
| 2013/0220279 A1 | 8/2013 | Cleeves |
| 2013/0319349 A1 | 12/2013 | Obrist |
| 2014/0060468 A1 | 3/2014 | Cleeves |
| 2014/0182549 A1 | 7/2014 | Cleeves |
| 2014/0311431 A1 | 10/2014 | Cleeves |
| 2014/0331656 A1 | 11/2014 | Nagar |
| 2015/0059694 A1 | 3/2015 | Cleeves |
| 2015/0096514 A1 | 4/2015 | Cleeves |
| 2019/0264608 A1* | 8/2019 | Kashyap ............... F02B 75/282 |
| 2019/0338679 A1 | 11/2019 | Kano |

FOREIGN PATENT DOCUMENTS

| | | |
|---|---|---|
| CN | 105240120 | 1/2016 |
| CN | 105937440 | 9/2016 |
| EP | 2762704 | 8/2014 |
| JP | 11-257090 | 9/1999 |
| JP | 2008-502849 | 1/2008 |
| JP | 2013-545920 | 12/2013 |
| JP | 2016-521330 | 7/2016 |
| JP | 6153869 | 6/2017 |
| JP | 2017-193209 | 10/2017 |
| JP | 2018-119498 | 8/2018 |
| JP | 2021-020674 | 2/2021 |
| WO | 2013/047878 | 4/2013 |

OTHER PUBLICATIONS

English Translation of International Preliminary Report on Patentability for PCT/JP2019/000413, dated Jul. 30, 2020, 14 pages.
International Search Report for PCT/JP2019/000413, dated Apr. 2, 2019, 2 pages.
Office Action for CN Patent Application No. 201980008185.1, dated Jul. 29, 2021, 10 total pages.

* cited by examiner

POWER GENERATION DEVICE AND AUTOMOBILE

TECHNICAL FIELD

The present invention relates to a power generation device which is included in a vehicle and generates electric energy used for driving the vehicle, and an automobile including the power generation device.

BACKGROUND ART

There have been developed hybrid automobiles respectively equipped with various hybrid systems. According to a series hybrid technology, which is a category of hybrid system, an engine generates electric power by causing a power generator to rotate, but power from the engine is not directly transmitted to a driving wheel. The vehicle is driven by causing a driving motor to rotate with use of electric power supplied from a battery.

The engine used in the series hybrid technology repeats running and stopping in accordance with a remaining amount of the battery. One of the characteristics which the engine of the series hybrid technology needs to have in order to prevent a rider of the vehicle from experiencing discomfort by sensing this operation of the engine is to generate less noise and vibration.

For example, Patent Literature 1 discloses a machinery combination (here, referred to as a "first device") which includes an internal combustion engine and a generator and enables reduction of noise and vibration. Specifically, the first device includes two cylinder/piston units arranged in parallel with each other, and a crankshaft is connected to each cylinder/piston unit via a connection rod. The two crankshafts include respective balance weights, and spur gears are coaxially fastened to the respective two crankshafts. The two spur gears mesh with each other and rotate in opposite directions to each other.

With this, vibration inertial forces of the respective two spur gears cancel each other out, so that generation of vibration is reduced. The first device includes a single generator which is connected to the spur gears via an intermediate gear, so that the first device can generate electric power.

Non-patent Literature 1 discloses a device (here, referred to as a "second device") which is an improvement from the first device and includes two spur gears and generators connected to the respective two spur gears via a chain. In the second device, imbalance of secondary inertial forces is solved by employing a configuration in which the two generators rotate in opposite directions to each other at a rotational frequency two times higher than a rotational frequency of the crankshafts. A reaction force of torque fluctuation which occurs during an operation of an engine causes unbalanced moments. In the second device, the unbalanced moments are canceled out by the two generators. This further reduces generation of vibration.

CITATION LIST

Patent Literature

[Patent Literature 1]
Japanese Patent No. 6153869 (Publication Date: Jun. 28, 2017)

Non-Patent Literature

[Non-patent Literature 1]
"Components_LEADING INNOVATIONS_THE ZERO VIBRATION ENGINE", [online], OBRIST Powertrain GmbH, [Search Date: Dec. 7, 2017], the Internet <URL: https://www.obrist-powertrain.com/components/>

SUMMARY OF INVENTION

Technical Problem

The engine provided in the vehicle of the series hybrid technology is facing an additional demand regarding the following point. According to the series hybrid technology, power generated by the engine is converted into electric energy with use of a generator, and then the electric energy is supplied to a driving motor. This inevitably causes a decrease in energy transmission efficiency. As such, an extra improvement in thermal efficiency of the engine is required so that the decrease in energy transmission efficiency is compensated for.

However, although the above-described first and second devices of the conventional technologies can reduce the generation of vibration, the degrees of improvement made by the first and second devices in terms of thermal efficiency are only limited. It is thus necessary to develop a new technology that achieves both quietness and high thermal efficiency in a power generation device provided in a vehicle of the series hybrid technology and including an engine and a generator.

An aspect of the present invention was made in view of the above existing problem and has an object of providing a power generation device that can not only reduce the generation of vibration but also increase thermal efficiency.

Solution to Problem

In order to attain the object, a power generation device in accordance with an aspect of the present invention is a power generation device, including: a piston engine including a first piston, a second piston, a cylinder, a first crankshaft, and a second crankshaft, the first piston and the second piston reciprocating in the cylinder while facing each other, so that the first crankshaft rotates in a first rotation direction in accordance with the first piston and the second crankshaft rotates in a second rotation direction opposite to the first rotation direction in accordance with the second piston; a primary inertia body coupled to each of the first crankshaft and the second crankshaft; and a secondary inertia body which is connected to the primary inertia body via a power transmission section and rotates in conjunction with the primary inertia body at a speed increased at a basic step-up ratio of the power transmission section, the secondary inertia body including at least a power generator, a sum of an inertia moment of the primary inertia body and a product of an inertia moment of the secondary inertia body and the basic step-up ratio being defined to be a total inertia moment, a total inertia moment in the first rotation direction and a total inertia moment in the second rotation direction being balanced with each other by not less than 50%.

Advantageous Effects of Invention

An aspect of the present invention makes it possible to provide a vehicle-use power generation device that can not only reduce the generation of vibration but also increase thermal efficiency.

BRIEF DESCRIPTION OF DRAWINGS

(a) of FIG. 2 is a plan view schematically illustrating a configuration of a power generation device in accordance with Embodiment 1 of the present invention, and (b) of FIG. 2 is a lateral view schematically illustrating a configuration of the power generation device.

(a) of FIG. 4 is a plan view schematically illustrating a configuration of a power generation device in accordance with Embodiment 3 of the present invention, and (b) of FIG. 4 is a lateral view schematically illustrating a configuration of the power generation device.

(a) of FIG. 6 is a plan view schematically illustrating a configuration of an automobile, in which a power generation device is provided, in accordance with Embodiment 5 of the present invention. (b) of FIG. 6 is a plan view illustrating a variation of the automobile.

DESCRIPTION OF EMBODIMENTS

The following description will discuss embodiments of the present invention in detail. The descriptions herein are provided to aid understanding of the gist of the present invention. Unless otherwise stated, the descriptions do not serve to limit the present invention. The shapes and dimensions (e.g., length, depth, and width) as depicted in the drawings do not necessarily reflect actual shapes and dimensions, and may be shapes and dimensions which have been altered in order to clarify and simplify the drawings.

Figure 1:
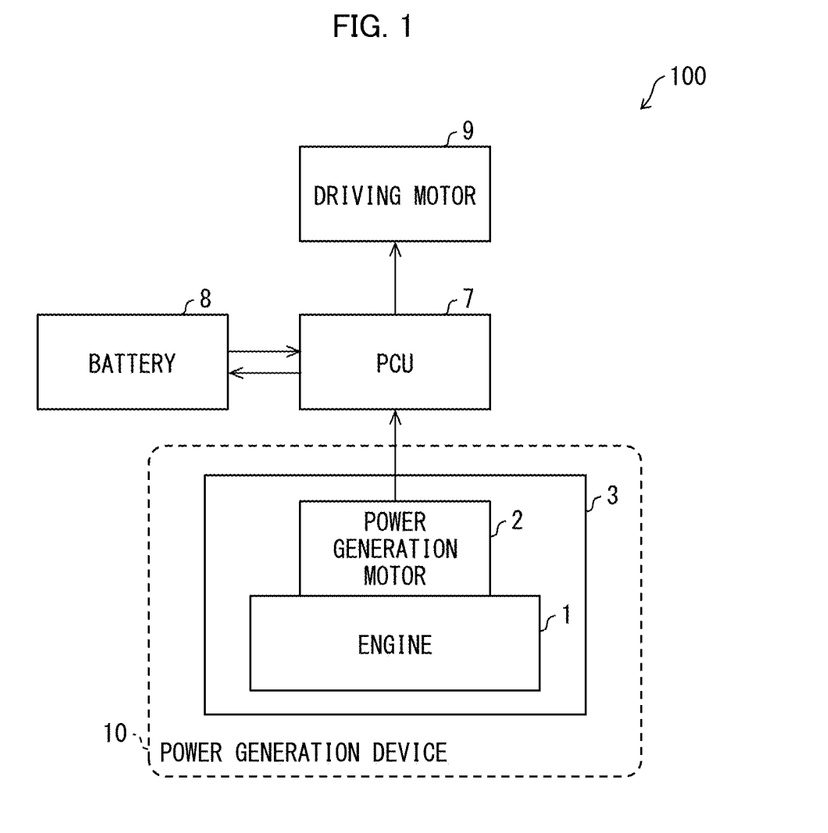
FIG. 1 is a view schematically illustrating a configuration of a power train of a series hybrid technology including a power generation device.

First, the following will discuss, with reference to FIG. 1, a power train of a hybrid car of the series hybrid technology including a power generation device, and will discuss existing problems in the field as well as a solution at which the inventors of the present invention arrived. FIG. 1 is a view schematically illustrating a configuration of a power train 100 of the series hybrid technology including a power generation device 10.

As illustrated in FIG. 1, the power train 100 includes the power generation device 10, a power control unit (PCU) 7, a battery 8, and a driving motor 9. The power generation device 10 includes an engine 1, a power generation motor 2, and a housing 3. The engine 1 and the power generation motor 2 are rigidly linked to the housing 3 with use of a supporting structure (not illustrated).

The PCU 7 includes various electric control systems such as an inverter and a converter, and carries out control of the driving motor 9 and the like. Electric power generated by the power generation motor 2 is stored in the battery 8 via the PCU 7. The PCU 7 uses an electric power supplied from the battery 8 to cause the driving motor 9 to operate. The driving motor 9 drives wheels of a vehicle via a drive unit (not illustrated).

The power generation motor 2, the PCU 7, the battery 8, and the driving motor 9 can each be a well-known device that would be included in a power train of a hybrid car of the series hybrid technology. As such, for simple explanation, detailed description of the power generation motor 2, the PCU 7, the battery 8, and the driving motor 9 will be omitted. In the following description, illustration and detailed description may be omitted for a configuration that can employ a well-known member.

Generally, a reciprocating gasoline engine, which is provided in a conventional car that is driven by transmission of power generated in an internal combustion engine to wheels, is designed to be capable of generating power appropriately in accordance with various driving situations of the car such as acceleration and deceleration. The reciprocating gasoline engine may hereinafter be referred to as an "ordinary engine". The ordinary engine has a multi-cylinder structure in which a plurality of cylinders are covered by a cylinder head and housed in a cylinder block. Various techniques of reducing generation of vibration by utilizing this structure have been applied.

In contrast, in the above-described hybrid car of the series hybrid technology, the engine 1 is basically used only for the generation of electric power with use of the power generation motor 2. Thus, the engine 1 differs from the ordinary engine in situation of use, and when operating, the engine 1 runs at a rotational speed in a middle speed range so as to have a large torque. It is not necessary to assume situations where the engine 1 operates at various rotational speeds from a low speed range to a high speed range. The engine 1 only needs to be able to run efficiently in a narrow rotation range.

As described above, however, according to the series hybrid technology, power generated by the engine 1 is converted into electric energy first and then used by the driving motor 9. This inevitably causes a decrease in energy transmission efficiency. In order to compensate for this decrease in heat transfer efficiency, high thermal efficiency is a particularly important property to be exhibited by the engine 1.

In the past, various techniques related to improvement of thermal efficiency of the ordinary engine (for example, a technique of reducing loss caused by mechanical resistance and the like). However, it is fundamentally difficult for the ordinary engine to achieve a reduction of cooling loss. This is due to reasons such as cooling loss caused by transmission of heat to the large cylinder head and difficulty of reducing a value of a ratio (which may be hereinafter referred to as a "S/V ratio") of a surface area and a volume of a combustion chamber.

With the ordinary engine, improvement of energy efficiency (thermal efficiency) is achieved by measures such as (i) reducing the number of cylinders and (ii) designing a stroke (a distance travelled by a reciprocating piston in one move) to be longer than a bore (an inner diameter of the combustion chamber). Techniques such as engine downsizing with a turbo charger and use of a lean-burn engine may also be employed.

However, the thermal efficiency of the ordinary engine can be increased by these techniques only to a limited extent, and the technique may result in an increase in vibration generated by the operation of the engine.

Further, the improvement of thermal efficiency is fundamentally difficult also in a case of using a known rotary engine as the engine to be provided in the hybrid car of the series hybrid technology.

Under the circumstances, the inventors of the present invention conducted diligent study to arrive at an engine suitable for the hybrid car of the series hybrid technology, and developed an idea of using an opposed-piston engine instead of the ordinary engine which is currently the mainstream engine. Then, the inventors of the present invention achieved reduction of the generation of vibration in operation of the engine, and thus completed the present invention.

Embodiment 1

Figure 2:
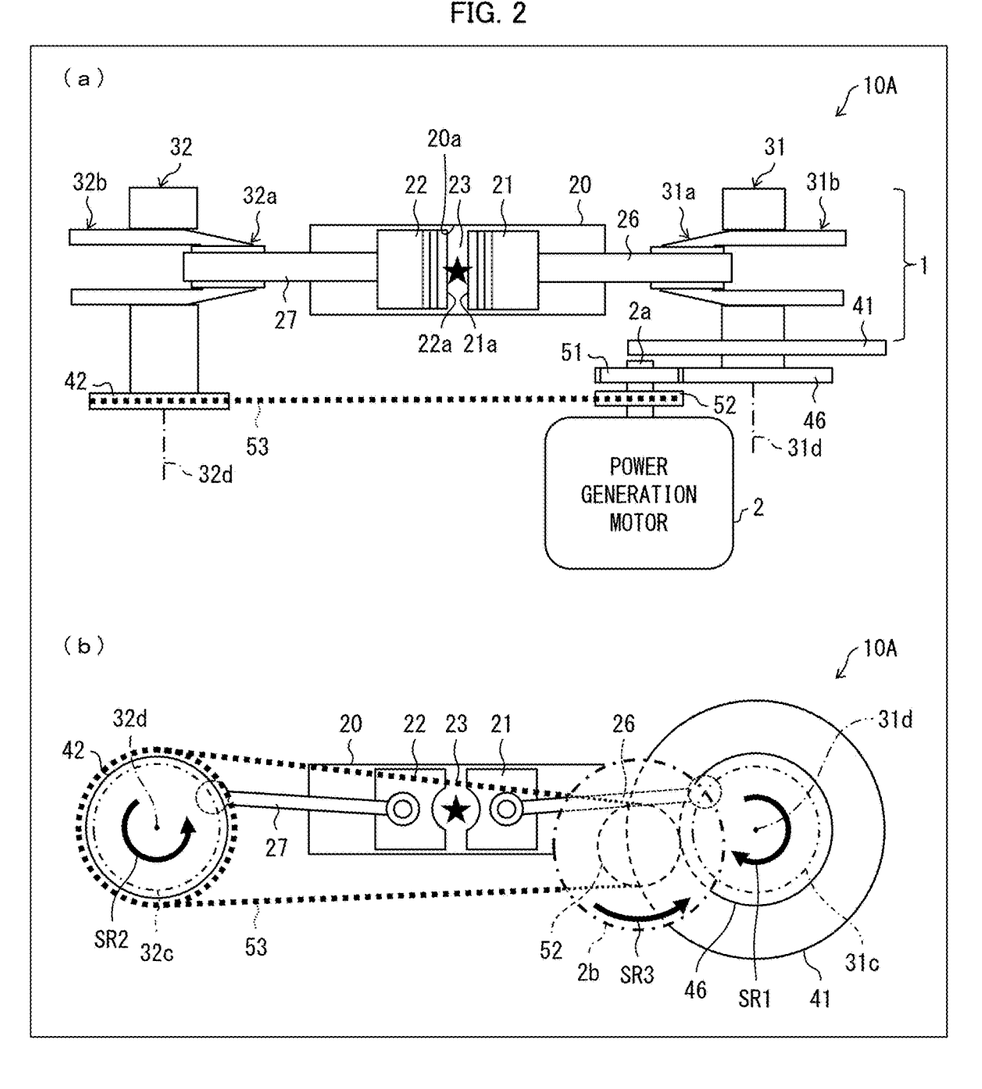

The following description will discuss a power generation device in accordance with Embodiment 1 of the present invention with reference to (a) and (b) of FIG. 2. For easy understanding of a structure of the power generation device, (a) and (b) of FIG. 2 each provide a see-through illustration of a portion of a housing section of a cylinder 20.

For convenience of explanation, the description below of the present specification uses words such as "above", "upper", "below", "lower", "left", and "right" to mean the following. Words such as "left" are used to refer to the left side for the viewer of a drawing with the drawing number appearing at the top of the drawing, and words such as "right" are used to refer to the right side of a drawing with the drawing number appearing at the top of the drawing. Further, words such as "below" and "lower" in the description below indicate gravitationally below unless otherwise specified. Needless to say, it is possible to make modifications within the scope of the present invention, such as employing a configuration in which a constituent member on the right side of the power generation device and a constituent member on the left side of the power generation device are replaced with each other.

A power generation device 10A described in Embodiment 1 can be used as the power generation device 10 of the power train 100 illustrated in FIG. 1 described above. That is, Embodiment 1 deals with a case in which the power generation device 10A is provided in the hybrid car of the series hybrid technology. A power generation device in accordance with an aspect of the present invention may be referred to also as a vehicle-use power generation device which is provided in a vehicle and generates electric energy used for driving the vehicle.

Further, a power generation device in accordance with an aspect of the present invention can be suitably provided in a vehicle with which vibration generated by an operation of an engine or the like can be problematic. In other words, a power generation device in accordance with an aspect of the present invention is provided and suitably used in a vehicle that needs to have high tranquility (a low vibration property and a low noise property).

Note that a vehicle in which a power generation device in accordance with an aspect of the present invention is provided is not limited to a general-purpose automobile and can be, for example, various vehicles such as a large automobile, a motorcycle, a motor tricycle, and the like. Further, a power generation device in accordance with an aspect of the present invention is applicable, for example, to a system (a range extender) for extending a range of an electric automobile or the like and to a small ship such as a motor boat.

<Device Configuration>

The following will discuss a configuration of the power generation device 10A of Embodiment 1 with reference to (a) of FIG. 2. (a) of FIG. 2 is a plan view schematically illustrating a configuration of the power generation device 10A of Embodiment 1.

As illustrated in (a) of FIG. 2, the power generation device 10A includes (i) an engine (a piston engine) 1, (ii) a right flywheel 41 and a left flywheel 42 serving as a primary inertia body, and (iii) a power generation motor 2 serving as a secondary inertia body. The engine 1, the right flywheel 41 and the left flywheel 42, and the power generation motor 2 are connected to one another via a power transmission section (described later) so as to move in conjunction with one another.

The engine 1 is a main body part (an engine main body) of an opposed-piston engine which includes various accessories (not illustrated). The engine 1 includes the cylinder 20, two pistons inserted into the cylinder 20, and sets of a connecting rod and a crankshaft which sets are connected to the respective two pistons.

Specifically, the engine 1 operates by reciprocating movements of a first piston 21 and a second piston 22 in the cylinder 20 such that the first piston 21 and the second piston 22 face each other. A combustion chamber 23 is formed in the cylinder 20. The combustion chamber 23 is defined by being surrounded by a piston head 21a of the first piston 21, a piston head 22a of the second piston 22, and an inner wall 20a of the cylinder 20.

In FIG. 2, a star sign inside the combustion chamber 23 represents a center of the cylinder 20, i.e., an ideal ignition position for a fuel to be ignited. Ignition of the fuel at this ignition position can be achieved by laser ignition. The same applies to the following description in the present specification. Note that a method of combustion of the fuel in the combustion chamber 23 is not particularly limited.

Combustion of the fuel in the combustion chamber 23 causes the first piston 21 and the second piston 22 to reciprocate so as to face each other. The fuel is supplied from a fuel tank (not illustrated) to the engine 1. The fuel may be light oil, for example. In such a case, the engine 1 includes an injector (not illustrated) for injecting the fuel and operates in accordance with a well-known combustion method generally used in a diesel engine. In the power generation device 10A of Embodiment 1, one operation cycle of the engine 1 consists of two movements (strokes).

Note that examples of the fuel are not limited to light oil, and encompass gasoline, a composite fuel containing hydrogen, a bioethanol fuel, and other fuels. The engine 1 may employ a well-known combustion method in accordance with a fuel type. For example, in a case where gasoline is used as the fuel in the engine 1, the combustion chamber 23 may include a spark plug (not illustrated) and an injector (not illustrated) for injecting the fuel.

The first piston 21 is connect to a crankpin 31a of a right crankshaft (a first crankshaft) 31 via a right connecting rod 26. The second piston 22 is connected to a crankpin 32a of a left crankshaft (a second crankshaft) 32 via a left connecting rod 27.

The right crankshaft 31 includes a balance weight 31b. To one end part of the right crankshaft 31 in a direction parallel to a rotation axis of the right crankshaft 31, a coupling gear 46 is coupled. The right flywheel 41 is attached to the right crankshaft 31 in the vicinity of the coupling gear 46. The right flywheel 41 and the coupling gear 46 rotate at the same rotational speed (rotational frequency) and in the same direction as the right crankshaft 31 rotates.

The left crankshaft 32 includes a balance weight 32b, and the left flywheel 42 is coupled to one end part of the left crankshaft 32 in a direction parallel to a rotation axis of the left crankshaft 32. The left flywheel 42 rotates at the same rotational speed (rotational frequency) and in the same direction as the left crankshaft 32 rotates.

The power generation motor 2 of the power generation device 10A is provided on a side of the engine 1. The power generation motor 2 may be, for example, a well-known vehicle-use power generator (alternator).

The power generation motor 2 includes a rotation shaft 2a. The power generation motor 2 is arranged such that an end of the rotation shaft 2a which end protrudes from the power generation motor 2 faces the engine 1. A step-up gear 51 and a chain receiving section (a sprocket) 52 are attached to the rotation shaft 2a in this order from a side distal to the power generation motor 2. The step-up gear 51 and the chain receiving section 52 are provided coaxially with the rotation shaft 2*a* and rotate in conjunction with the rotation shaft 2*a*. That is, the step-up gear 51 and the chain receiving section 52 rotate at the same rotational speed (rotational frequency) and in the same direction as the power generation motor 2 rotates.

The left flywheel 42 has teeth on an outer circumference thereof, and the left flywheel 42 and the chain receiving section 52 are connected to each other via a step-up chain 53. The coupling gear 46 attached to the right crankshaft 31 and the step-up gear 51 are mesh with each other.

The power generation device 10A includes a combination (a first power transmission section) of the coupling gear 46 and the step-up gear 51 and a combination (a second power transmission section) of the left flywheel 42, the step-up chain 53, and the chain receiving section 52.

The first power transmission section and the second power transmission section are identical in step-up ratio and serve as a power transmission section which transmits power generated by the engine 1 to the power generation motor 2. The power generation motor 2 is connected to (rotates in conjunction with) the right flywheel 41 via the first power transmission section and connected to (rotates in conjunction with) the left flywheel 42 via the second power transmission section.

The first power transmission section and the second power transmission section are design to be identical in step-up ratio. In the power generation device 10A, the left flywheel 42 and the coupling gear 46 are substantially identical in diameter, and the chain receiving section 52 and the step-up gear 51 are substantially identical in diameter. This makes it easier for the first power transmission section and the second power transmission section to be identical in step-up ratio.

As described above, the engine 1 and the power generation motor 2 are rigidly linked to a housing 3 (see FIG. 1) by a supporting structure (not illustrated). A rotation axis 31*d* of the right crankshaft 31, a rotation axis 32*d* of the left crankshaft 32, and the rotation shaft 2*a* of the power generation motor 2 are parallel to one another.

(Operation of Engine)

The following will discuss an operation of the engine 1, with reference to (a) and (b) of FIG. 2. (b) of FIG. 2 is a lateral view schematically illustrating a configuration of the power generation device 10A.

In a state illustrated in (a) of FIG. 2 of the engine 1, the first piston 21 and the second piston 22 are each located in the vicinity of a top dead center. When the fuel is combusted in the combustion chamber 23, the first piston 21 and the second piston 22 move rightward and leftward in FIG. 2, respectively.

As illustrated in (b) of FIG. 2, when the engine 1 operates, the right crankshaft 31 rotates in a first rotation direction and the left crankshaft 32 rotates in a second rotation direction, in conjunction with the above-described movements of the pistons. In the example illustrated in FIG. 2, the first rotation direction is a clockwise direction and the second rotation direction is a counterclockwise direction.

A virtual circle 31*c* represents a trajectory followed by the crankpin 31*a* of the right crankshaft 31 when the engine 1 operates. The virtual circle 32*c* represents a trajectory followed by the crankpin 32*a* of the left crankshaft 32 when the engine 1 operates. A virtual circle 2*b* schematically represents a rotation of a rotating body (e.g., a rotor) inside the power generation motor 2.

In the following description, a rotational speed of the right crankshaft 31 in the first rotation direction will be referred to as a rotational speed SR1*m*, and a rotational speed of the left crankshaft 32 in the second rotation direction will be referred to as a rotational speed SR2. The right flywheel 41 rotates at the rotational speed SR1, and the left flywheel 42 rotates at the rotational speed SR2. The rotational speed SR1 and the rotational speed SR2 are opposite in rotation direction and identical in rotational speed (rotational frequency).

The step-up gear 51 rotates in the second rotation direction at a speed increased at a predetermined speed changing ratio (step-up ratio) on the basis of the number of teeth of the coupling gear 46 and the number of teeth of the step-up gear 51. The chain receiving section 52 rotates in the second rotation direction at a speed increased by the step-up chain 53 at a predetermined step-up ratio on the basis of the number of teeth of the left flywheel 42 and the number of teeth of the chain receiving section 52. In other words, the power generation motor 2 rotates in conjunction with the right flywheel 41 and the left flywheel 42 at a speed increased at a predetermined step-up ratio (a basic step-up ratio) of the power transmission section. A rotational speed of the power generation motor 2 in the second rotation direction will be referred to as a rotational speed SR3.

Here, an operation of a general reciprocating engine will be described. An engine that has a structure in which reciprocating motions of pistons are converted into rotational motions of crankshafts, an imbalance between inertial forces of the pistons causes a vibratory force and also causes a vibratory moment, which is generated as a reaction force of torque fluctuation. Accordingly, an operation of the engine can generate vibration. Particularly, the smaller the number of cylinders is, the greater the generated vibration is.

In contrast, in the power generation device 10A of Embodiment 1, the first piston 21 and the second piston 22 move symmetrically to each other, so that reciprocating inertial forces are completely balanced with each other. Further, in the power generation device 10A, a reaction force generated by torque fluctuation caused by acceleration and deceleration of the right flywheel 41 is balanced with that of the left flywheel 42. This will be discussed below in detail.

(Balance Between Inertia Moments)

Generally, a hybrid car of the series hybrid technology is required to have less vibration and noise generated by an engine. In this case, the engine is configured to have a small number of cylinders, because the engine is basically used only for rotating a power generation motor and thus does not need to achieve high output. Further, the rotational frequency of the engine does not have to be extremely high. Accordingly, the engine carries out a high load (high torque) operation, which increases torque fluctuation.

As such, a conventional opposed-piston engine tends to generate vibration when applied to a hybrid car of the series hybrid technology. It is therefore believed to be common for a person skilled in the art to be reluctant to employ the opposed-piston engine. The inventors of the present invention arrived at an idea that using the power generation motor 2 as a secondary inertia body might solve the above problem by means of a relatively simple configuration.

The power generation motor 2 is caused by the first power transmission section and the second power transmission section to rotate at a speed increased at a predetermined step-up ratio (a basic step-up ratio) n with respect to rotations of the right flywheel 41 and the left flywheel 42. That is, the right flywheel 41, the left flywheel 42, and the power generation motor 2 rotate in conjunction with one another at respective rotational speeds which are in the following relationship: rotational speed SR1=rotational speed SR2= (rotational speed SR3)/n.

In the power generation device 10A of Embodiment 1, (i) an inertia moment of the right flywheel 41 which rotates in the first rotation direction and (ii) a sum of an inertia moment of the left flywheel 42 which rotates in the second rotation direction and a product of an inertia moment of the power generation motor 2 and the step-up ratio are balanced with each other. That is, the power generation device 10A of Embodiment 1 satisfies a relationship represented by the following formula (1):

$$IRF=ILF+n\times IG \qquad (1)$$

wherein:
IRF is the inertia moment of the right flywheel 41 which rotates in the first rotation direction;
ILF is the inertia moment of the left flywheel 42 which rotates in the second rotation direction;
IG is the inertia moment of the power generation motor 2 which rotates in the second rotation direction; and
n is the predetermined step-up ratio (the basic step-up ratio) of the power transmission section.

The following explains n×IG included in the formula (1). Multiplication of a change in speed (angular acceleration) of a rotating body by an inertia moment yields a torque for acceleration. The power generation motor 2 has an angular acceleration that is n times an angular acceleration of the right flywheel 41 based on the step-up ratio n. This is because angular acceleration is proportional to speed, and is proportional to step-up ratio, accordingly.

As such, during an operation of the engine 1, the power generation motor 2 affects the total inertia moment as if the total inertia moment is n times the inertia moment IG which is uniquely determined by mass, diameter, and the like. This is why the formula (1) representing the balance between the inertia moments includes n×IG. This n×IG may be referred to also as an effective inertia moment of the power generation motor 2 during an operation of the engine 1.

As the formula (1) indicates, in the power generation device 10A of Embodiment 1, the inertia moment IRF of the right flywheel 41 is greater than the inertia moment ILF of the left flywheel 42. That is, the right flywheel 41 is greater than the left flywheel 42 in at least one of mass and diameter.

As described above, the power generation device 10A can achieve, by a so-called heron balancer effect, a reduction of occurrence of unbalanced moments caused by a reaction force of torque fluctuation.

Further, the power generation device 10A is preferably configured such that, in a plan view as illustrated in (b) of FIG. 2, the rotation axis 31$d$ of the right crankshaft 31 and the rotation axis 32$d$ of the left crankshaft 32 be each located below a horizontal plane that contains the center of the cylinder 20. In such a case, it is possible to make the right connecting rod 26 and the left connecting rod 27 approximately horizontal when the fuel is combusted in the combustion chamber 23. This allows the first piston 21 and the second piston 22 to have less thrust force exerted to the inner wall of the cylinder 20, and also allows the right crankshaft 31 and the left crankshaft 32 to rotate in opposite directions to each other.

Note that the power generation device 10A only needs to satisfy the relationship represented by the formula (1). The configuration described above is merely an example, and specific configurations of the power transmission sections and the like are not particularly limited.

(Supplementary Note on Balance Between Inertia Moments)

In the power generation device 10A, a total inertia moment in the first rotation direction and a total inertia moment in the second rotation direction are identical. However, a power generation device in accordance with an aspect of the present invention is not limited to this.

Here, the total inertia moment in the first rotation direction is referred to as a first total inertia moment FMI, and the total inertia moment in the second rotation direction is referred to as a second total inertia moment SMI.

For example, a power generation device 10A1 in accordance with an aspect of the present invention can be configured such that the first total inertia moment FMI and the second total inertia moment SMI are substantially identical. In this case, the power generation device 10A1 satisfies a relationship represented by the following formula (1-1).

$$IRF\approx ILF+n\times IG \qquad (1\text{-}1)$$

Further, a power generation device in accordance with an aspect of the present invention exhibits an effect of reducing the generation of vibration in accordance with a rate of balance between inertia moments, even in a case where the balance between the inertia moments is insufficient. This will be explained below based on rough calculation (for simple explanation, precise calculation will not be given here). For example, in a case where inertia moments are balanced by 50%, vibration generated by a reaction force of torque fluctuation of the engine can be reduced to a half (50%). In this case, the power generation device can effectively enhance the low vibration property. In a case where inertia moments are balanced by 70%, vibration generated by a reaction force of torque fluctuation of the engine can be reduced to 30%.

As such, a power generation device 10A2 in accordance with an aspect of the present invention can be configured such that, for example, the first total inertia moment FMI and the second total inertia moment SMI are balanced with each other by not less than 50%.

Note that the expression "the first total inertia moment FMI and the second total inertia moment SMI are balanced with each other by not less than 50%" is defined as follows. Assuming that the first total inertia moment FMI is greater than the second total inertia moment SMI, the power generation device 10A2 only needs to satisfy a relationship represented by the following formula.

$$(SMI/FMI)>0.5 \qquad (1\text{-}2)$$

Note that in a case where the second total inertia moment SMI is greater than the first total inertia moment FMI, the left side of the formula (1-2) is (FMI/SMI).

Further, in a power generation device of another aspect of the present invention, the first total inertia moment FMI and the second total inertia moment SMI are preferably balanced with each other by not less than 70%, more preferably balanced with each other by no less than 90%.

In a power generation device of still another aspect of the present invention, the first total inertia moment FMI and the second total inertia moment SMI are more preferably balanced with each other completely (100%) or substantially completely (not less than 95%). This allows the power generation device to generate substantially no vibration during an operation of the engine.

The above description regarding balance between inertia moments also applies to other embodiments which will be described later.

(Advantages of Power Generation Device of the Present Embodiment)

As described above, the power generation device 10A of Embodiment 1 includes the engine 1 which is an opposed-piston engine. The power generation device 10A is configured such that, when a sum of (i) the inertia moment of the primary inertia body and (ii) a product of the inertia moment of the secondary inertia body and the step-up ratio is defined to be a total inertia moment, a total inertia moment in the first rotation direction and a total inertia moment in the second rotation direction are balanced with each other. This yields the following effects.

(1) Improvement in Thermal Efficiency

The engine 1 can have a long effective stroke relative to the bore. For example, a stroke/bore ratio can be set to be approximately 2 times or more. This is because even if one crank stroke is the same, actual motions of the pistons are doubled. An attempt to increase a stroke in order to improve thermal efficiency is commonly practiced with the ordinary engine as well, but a stroke/bore ratio achieved in such a case is merely approximately 1.2 to 1.3.

Further, the engine 1 needs no cylinder head and therefore can achieve a reduction in surface area of the combustion chamber 23. This allows the engine 1 to have an S/V ratio significantly smaller than that of the ordinary engine when comparison is made based on the same engine displacement. Accordingly, the engine 1 can achieve a reduction in cooling loss.

Thus, the use of the engine 1 allows the power generation device 10A to achieve a high thermal efficiency so as to compensate for a decrease in energy transmission efficiency of a hybrid car of the series hybrid technology. The power generation device 10A can also achieve a reduction in production cost since the engine 1 does not need a complicated cylinder head.

(2) Reduction of Generation of Vibration and Noise

The power generation device 10A also exhibits the following effect when the engine 1 operates. That is, in the power generation device 10A, reciprocating inertial forces generated in the engine 1 cancel each other out by the symmetrical motions of the left and right pistons. Further, in the power generation device 10A, the heron balancer effect exhibited by the right flywheel 41 and the left flywheel 42 rotating in opposite directions to each other and the power generation motor 2 reduces unbalanced moments caused by a reaction force of torque fluctuation.

Accordingly, the power generation device 10A can reduce generation of vibration and noise so as to conform to the levels of quietness and a low vibration property which a hybrid car of the series hybrid technology is required to have.

(3) Weight Reduction and Space Saving

In a vehicle of the series hybrid technology, a large and heave battery is provided. As such, an engine to be provided in a hybrid car of the series hybrid technology is required to be lightweight and small-sized. Further, a power generation device to be provided in the vehicle is evidently more advantageous if the power generation device is lightweight in order to improve energy efficiency, and the power generation device is also requested to have a shape that makes it easier to provide the power generation device in the vehicle.

The engine 1 of Embodiment 1 needs two sets of crankshafts but does not need a cylinder head. This allows the engine 1 to have a mass equivalent to that of the ordinary engine which includes a cylinder head, when comparison is made based on the same engine displacement. Further, the engine 1, which differs from the ordinary engine in shape and in position of an output shaft, requires careful consideration of arrangement in providing the engine 1 in a vehicle. It is possible, however, to provide the engine 1 compactly in the vehicle by employing the following arrangement, for example. That is, the engine 1 can be fitted in a vehicle body compactly by arranging the engine 1 in a position that is within the vehicle body and either closer to a front side of the vehicle than a front axle of the vehicle or closer to a rear side of the vehicle than a rear axle of the vehicle such that a longitudinal direction of the power generation device 10A is parallel to a width direction of the vehicle. The specific arrangement can be understood by referring to Embodiment 5 which will be described later. In the hybrid car of the series hybrid technology, a position of an output shaft is determined by an arrangement of a driving motor. The power generation device 10A can therefore be arranged with a high degree of freedom.

Further, in the power generation device 10A, the power generation motor 2 is driven at a speed which is increased. It is therefore possible to employ a small-sized and light-weight power generator as the power generation motor 2. This allows the power generation device 10A to be light-weight.

Note that the descriptions in (1) through (3) above also apply to a case where a power generation device in accordance with an aspect of the present invention is used as a range extender of an electric automobile.

(Other Configurations)

(a) In the power generation device 10A of Embodiment 1, the engine 1 operates by two strokes. A power generation device of another aspect of the present invention is not limited to this, and can be of a type in which the engine operates by four strokes. In this case, the power generation device can achieve the operation by four strokes by, for example, including an intake and exhaust sleeve valve currently in the development process by Pinnacle Engines, Inc.

(b) The coupling gear 46 and the step-up gear 51 each preferably have an anti-backlash mechanism in order to reduce backlash. A well-known configuration (e.g., a friction gear) can be used as the anti-backlash mechanism. In the present specification, a gear having an anti-backlash mechanism may be referred to as an anti-backlash gear. In this case, it is possible to reduce generation of gear rattle caused by drive torque fluctuation.

(c) The step-up chain 53 can be substituted by a structure made of an odd number of gears coupled together. The same applies also to various step-up chains described below in the present specification.

(d) The power generation motor 2 only needs to be arranged such that the rotation shaft $2a$ is parallel to the rotation axis $31d$ of the right crankshaft 31 and the rotation axis $32d$ of the left crankshaft 32. The position of the power generation motor 2 is not particularly limited.

(e) The primary inertia body is not limited to the right flywheel 41 and the left flywheel 42. For example, a weight of the coupling gear 46 can be increased so that the coupling gear 46 functions as a primary inertia body that rotates in the first rotation direction.

(f) In a power generation device in accordance with an aspect of the present invention, the number of cylinders is not limited to one, and can be two or more.

Embodiment 2

The following description will discuss another embodiment of the present invention. For convenience of description, members having the same functions as those of the members described in the above-described embodiment are denoted by the same reference numerals, and description thereof will not be repeated.

The power generation device 10A of Embodiment 1 described above includes one power generation motor 2 as the secondary inertia body. In contrast, a power generation device 10B of Embodiment 2 includes one power generation motor 2 and one mechanical supercharger 61 as a secondary inertia body. Further, the power generation device 10B is also configured such that a cylinder 200 has an inflow opening 201 into which air supplied from the mechanical supercharger 61 flows.

Figure 3:
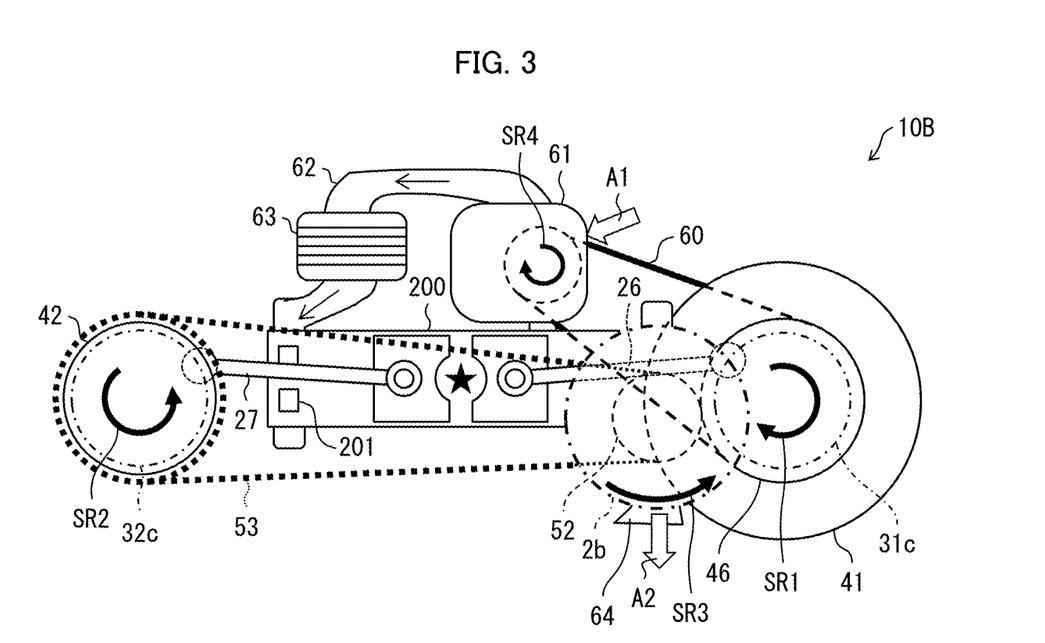
FIG. 3 is a lateral view schematically illustrating a configuration of a power generation device in accordance with Embodiment 2 of the present invention.

The following will discuss a configuration of the power generation device 10B in accordance with Embodiment 2 with reference to FIG. 3. FIG. 3 is a lateral view schematically illustrating a configuration of the power generation device 10B in accordance with Embodiment 2.

As illustrated in FIG. 3, the power generation device 10B includes the mechanical supercharger 61 which is connected to a right crankshaft 31 via a step-up belt 60. The mechanical supercharger 61 takes in and compresses air A1, and then supplies the compressed air to an intercooler 63 through an air supply pipe 62. The compressed air is cooled down while passing through the intercooler 63, and then enters the cylinder 200 via the inflow opening 201 in a state where a second piston 22 is in the vicinity of a bottom dead center. The air which has flown into the cylinder 200 passes through the cylinder 200 in a left-to-right direction, and gas after combustion is discharged through an outflow opening (not illustrated). Exhaust discharged from the outflow opening passes through an exhaust pipe 64 as exhaust A2.

The mechanical supercharger 61 is a mechanical supercharger which operates using power generated by an engine. The mechanical supercharger 61 contains a rotor which is rotatable. The inventors of the present invention arrived at an idea of using the mechanical supercharger 61 as a secondary inertia body. Note that a turbo charger which utilizes a flow of exhaust, an electromagnetically driven supercharger, and the like are not suitable for use as a secondary inertia body of a power generation device.

The power generation device 10B includes the following members as a power transmission section. That is, the power generation device 10B includes a combination (a first power transmission section) of a coupling gear 46 and a step-up gear 51 and a combination (a second power transmission section) of a left flywheel 42, a step-up chain 53, and a chain receiving section 52. The power generation device 10B further includes a combination (a third power transmission section) of a right crankshaft 31, a step-up belt 60, and a mechanical supercharger 61. The step-up belt 60 is connected to a rotating body (not illustrated) included in the right crankshaft 31.

The power generation motor 2 rotates in a second rotation direction (counterclockwise in FIG. 3) at a speed increased at a first step-up ratio of the first power transmission section. Further, the power generation motor 2 rotates in the second rotation direction (counterclockwise in FIG. 3) at a speed increased at a second step-up ratio of the second power transmission section. The first step-up ratio and the second step-up ratio are designed to be identical.

The mechanical supercharger 61 rotates in a first rotation direction (clockwise in FIG. 3) in conjunction with a right flywheel 41 at a speed increased at a third step-up ratio of the third power transmission section. A rotational speed of a rotating body inside the mechanical supercharger 61 will be referred to as SR4.

Here, a sum of an inertia moment of the right flywheel 41 which rotates in the first rotation direction and a product of an inertia moment of the mechanical supercharger 61 and the third step-up ratio is defined to be a total inertia moment in the first rotation direction. A sum of an inertia moment of the left flywheel 42 which rotates in the second rotation direction and a product of an inertia moment of the power generation motor 2 and the first step-up ratio is defined to be a total inertia moment in the second rotation direction.

In the power generation device 10B of Embodiment 2, the total inertia moment in the first rotation direction and the total inertia moment in the second rotation direction are balanced with each other. That is, the power generation device 10B of Embodiment 2 satisfies a relationship represented by the following formula (2):

$$IRF + nsc \times ISC = ILF + ng \times IG \quad (2)$$

where
IRF is the inertia moment of the right flywheel 41 which rotates in the first rotation direction;
ISC is the inertia moment of the mechanical supercharger 61 which rotates in the first rotation direction;
ILF is the inertia moment of the left flywheel 42 which rotates in the second rotation direction;
IG is the inertia moment of the power generation motor 2 which rotates in the second rotation direction;
nsc is the third step-up ratio of the third power transmission section; and
ng is the first step-up ratio of the first power transmission section or the second step-up ratio of the second power transmission section.

As the formula (2) indicates, in the power generation device 10B of Embodiment 2, the inertia moment IRF of the right flywheel 41 is greater than the inertia moment ILF of the left flywheel 42. Further, in the power generation device 10B, a product (ng×IG) of the inertia moment IG of the power generation motor 2 and the first step-up ratio or the second step-up ratio is greater than a product (nsc×ISC) of the inertia moment ISC of the mechanical supercharger 61 and the third step-up ratio. In other words, an effective inertia moment of the power generation motor 2 is greater than an effective inertia moment of the mechanical supercharger 61.

As described above, the power generation device 10B of Embodiment 2 includes the mechanical supercharger 61 and can achieve an increase in output of the engine 1. Further, in the power generation device 10B, the inertia moment in the first rotation direction and the inertia moment in the second rotation direction are balanced with each other. This enables reducing generation of unbalanced moments caused by a reaction force of torque fluctuation.

Embodiment 3

The following description will discuss still another embodiment of the present invention. For convenience of description, members having the same functions as those of the members described in the above-described embodiments are denoted by the same reference numerals, and description thereof will not be repeated.

The power generation device 10A of Embodiment 1 described above includes one power generation motor 2 as the secondary inertia body. In contrast, a power generation device 10C of Embodiment 2 includes two power generation motors (a power generation motor 11 and a power generation motor 12) as a secondary inertia body.

Figure 4:
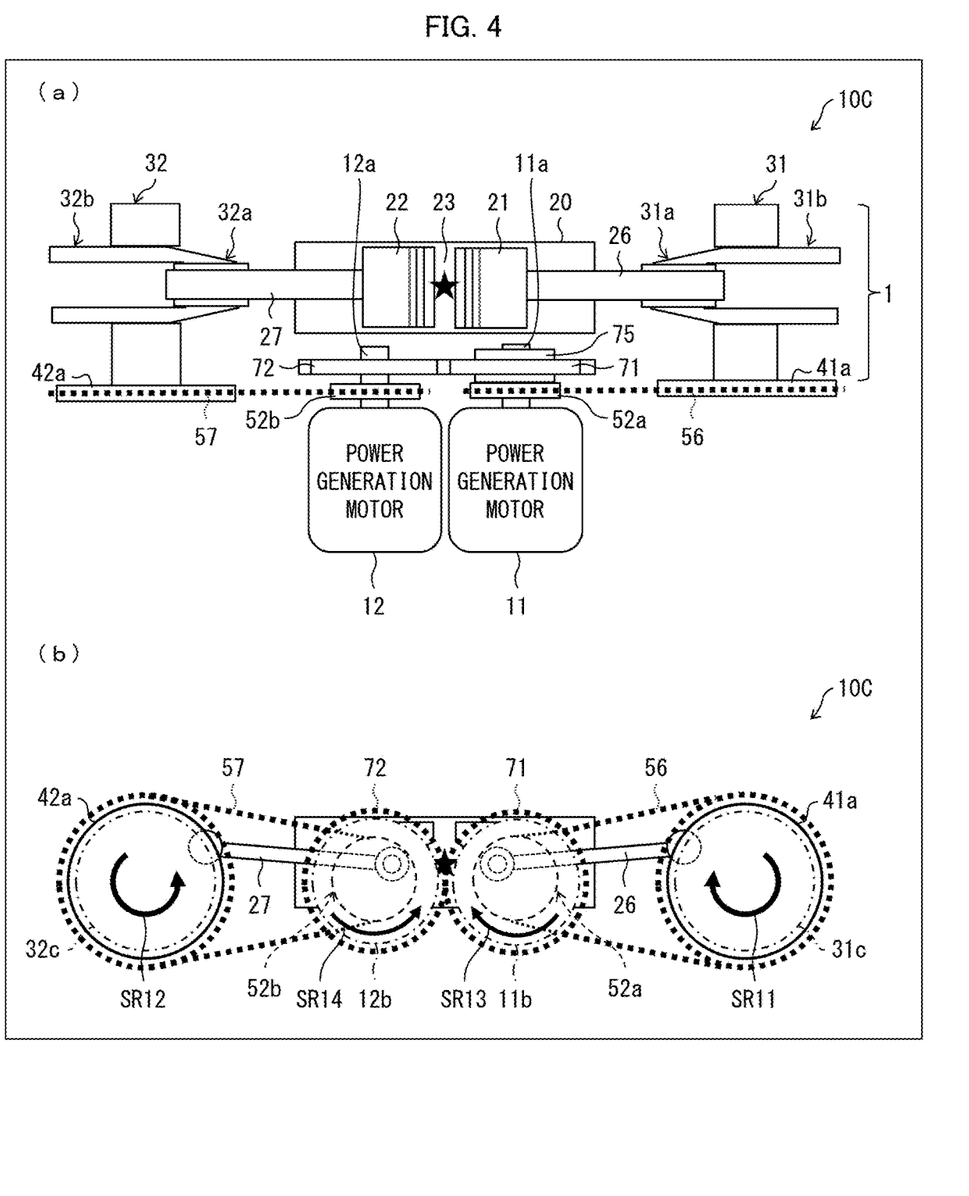

The following will discuss a configuration of the power generation device 10C in accordance with Embodiment 3 with reference to (a) and (b) of FIG. 4. (a) of FIG. 4 is a plan view schematically illustrating a configuration of the power generation device 10C in accordance with Embodiment 3, and (b) of FIG. 4 is a lateral view schematically illustrating a configuration of the power generation device 10C.

The power generation device 10C includes a right crankshaft 31 and a right flywheel 41a which is coupled to one end part of the right crankshaft 31 in a direction parallel to a rotation axis of the right crankshaft 31. The power generation device 10C includes a left crankshaft 32 and a left flywheel 42a which is coupled to one end part of the left crankshaft 32 in a direction parallel to a rotation axis of the left crankshaft 32.

The power generation device 10C includes a power generation motor (a first power generator) 11 and a power generation motor (a second power generator) 12 which are provided on a side of the cylinder 20 so as to be adjacent to each other. The power generation motor 11 includes a rotation shaft 11a, which is provided with a chain receiving section (a first power receiving section) 52a and an interlocking gear (a first interlocking member) 71. The power generation motor 12 includes a rotation shaft 12a, which is provided with a chain receiving section 52b and an interlocking gear (a second interlocking member) 72.

A virtual circle 11b schematically represents a rotation of a rotating body inside the power generation motor 11, and a virtual circle 12b schematically represents a rotation of a rotating body inside the power generation motor 12.

The right flywheel 41a and the left flywheel 42a each have teeth on an outer circumference thereof. The right flywheel 41a and the chain receiving section 52a are connected to each other via a step-up chain 56. The left flywheel 42a and the chain receiving section 52b are connected to each other via a step-up chain 57.

The right flywheel 41a rotates in a rotational speed SR11, and the left flywheel 42a rotates in a rotational speed SR12.

The power generation motor 11 rotates in a first rotation direction in conjunction with the right flywheel 41a at a speed increased at a predetermined step-up ratio (a first step-up ratio) of a combination (a first power transmission section) of the right flywheel 41a, the step-up chain 56, and the chain receiving section 52a. A rotational speed of the power generation motor 11 will be referred to as SR13.

The power generation motor 12 rotates in a second rotation direction in conjunction with the left flywheel 42a at a speed increased at a predetermined step-up ratio (a second step-up ratio) of a combination (a second power transmission section) of the left flywheel 42a, the step-up chain 57, and the chain receiving section 52b. A rotational speed of the power generation motor 12 will be referred to as SR14.

In the power generation device 10C, the first step-up ratio and the second step-up ratio are identical. The power generation motor 11 and the power generation motor 12 are configured such that the interlocking gear 71 and the interlocking gear 72 mesh (engage) with each other so that the power generation motor 11 and the power generation motor 12 rotate in conjunction with each other, at the same rotational speed as each other and in opposite rotation directions to each other.

The right flywheel 41a, the left flywheel 42a, the power generation motor 11, and the power generation motor 12 rotate in conjunction with one another at respective rotational speeds which are in the following relationship: rotational speed SR11=rotational speed SR12=(rotational speed SR13)/n=(rotational speed SR14)/n.

Here, a sum of an inertia moment of the right flywheel 41a which rotates in the first rotation direction and a product (an effective inertia moment of the power generation motor 11) of an inertia moment of the power generation motor 11 and the first step-up ratio is defined to be a total inertia moment in the first rotation direction. A sum of an inertia moment of the left flywheel 42a which rotates in the second rotation direction and a product (an effective inertia moment of the power generation motor 12) of an inertia moment of the power generation motor 12 and the second step-up ratio is defined to be a total inertia moment in the second rotation direction.

In the power generation device 10C of Embodiment 3, the total inertia moment in the first rotation direction and the total inertia moment in the second rotation direction are balanced with each other. That is, the power generation device 10C of Embodiment 3 satisfies a relationship represented by the following formula (3):

$$IRF + ng1 \times IG1 = ILF + ng2 \times IG2 \qquad (3)$$

where

IRF is the inertia moment of the right flywheel 41 which rotates in the first rotation direction;
ILF is the inertia moment of the left flywheel 42 which rotates in the second rotation direction;
IG1 is the inertia moment of the power generation motor 11 which rotates in the first rotation direction;
IG2 is the inertia moment of the power generation motor 12 which rotates in the second rotation direction;
ng1 is the first step-up ratio of the first power transmission section; and
ng2 is the second step-up ratio of the second power transmission section.

In the power generation device 10C of Embodiment 3, IRF=ILF, IG1=IG2, and ng1=ng2. The power generation device 10C can satisfy the relationship represented by the formula (3) without requiring a complicated structure. In the power generation device 10C, the effective inertia moment of the power generation motor 11 and the effective inertia moment of the power generation motor 12 are identical.

As described above, in the power generation device 10C of Embodiment 3, an inertia moment in the first rotation direction and an inertia moment in the second rotation direction are balanced with each other. This enables reducing generation of unbalanced moments caused by a reaction force of torque fluctuation.

Further, in the power generation device 10C of Embodiment 3, no drive torque is applied to the interlocking gear 71 and the interlocking gear 72. In addition, the interlocking gear 71 and the interlocking gear 72 each have a high circumferential velocity in the power generation device 10C. This makes it less likely for the interlocking gear 71 and the interlocking gear 72 to have a gear rattle. Accordingly, the power generation device 10C of Embodiment 3 can achieve a higher level of quietness.

Further, the power generation device 10C of Embodiment 3 can achieve an even higher level of quietness in a case where anti-backlash gears are used as the interlocking gear 71 and the interlocking gear 72. Since no large torque is applied to the interlocking gear 71 and the interlocking gear 72, the anti-backlash gears employed can be ones that are low in load. This makes it possible to enhance quietness while reducing mechanical energy loss caused by the anti-backlash gears.

Further, the power generation device 10C includes a phase variable member 75 attached to the rotation shaft 11a. The phase variable member 75 can change a phase relationship (phase angle) between the interlocking gear 71 and the chain receiving section 52a. The use of the phase variable member 75 enables changing a phase relationship between the right crankshaft 31 and the left crankshaft 32. The phase variable member 75, the first power transmission section, and the second power transmission section function as a crank phase variable mechanism.

In the power generation device 10C, no drive torque is applied to the interlocking gear 71 and the interlocking gear 72. As such, the phase variable member 75 employed can be one that is low in torque. It is thus possible to provide the power generation device 10C which allows a geometric compression ratio to be easily changed. In this case, the geometric compression ratio can be adjusted in accordance with a combustion state, a temperature, and the like of the engine 1. It is also possible to prevent knocking by reducing the compression ratio. Thus, the power generation device 10C can operate even more efficiently with a simple configuration.

Further, the power generation device 10C can generate electric power efficiently with use of the two power generation motors. In addition, the power generation device 10C is configured such that the interlocking gear 71, the interlocking gear 72, the chain receiving section 52a, and the chain receiving section 52b fit in a space between the right flywheel 41a and the left flywheel 42a. This allows the power generation device 10C to have a spatially compact shape.

Needless to say, the phase variable member 75 may be attached to the rotation shaft 12a.

(Variation)

In a variation of the power generation device 10C, for example, the power generation motor 12 may have a radius smaller than that of the power generation motor 11 and a shape whose length along a direction in which the rotation shaft 12a extends is long. This configuration may be employed, for example, in a case where space is limited. In this case, IG1>IG2. Accordingly, in the variation of the power generation device 10C, the first power transmission section and the second power transmission section may be designed to satisfy ng1<ng2. In this case, it is necessary to change a gear ratio so that the number of teeth of the interlocking gear 71 is smaller than that of the interlocking gear 72.

Embodiment 4

The following description will discuss still another embodiment of the present invention. For convenience of description, members having the same functions as those of the members described in the above-described embodiments are denoted by the same reference numerals, and description thereof will not be repeated.

The power generation device 10C of Embodiment 3 described above includes the power generation motor 11 and the power generation motor 12 as the secondary inertia body. In contrast, a power generation device 10D of Embodiment 4 includes, as a secondary inertia body, one mechanical supercharger 61 in addition to a power generation motor 11 and a power generation motor 12. Further, although not illustrated, the power generation device 10D is also configured such that a cylinder 200 has an inflow opening and an outflow opening through each of which air supplied from the mechanical supercharger 61 flows, as with Embodiment 2 described above.

Figure 5:
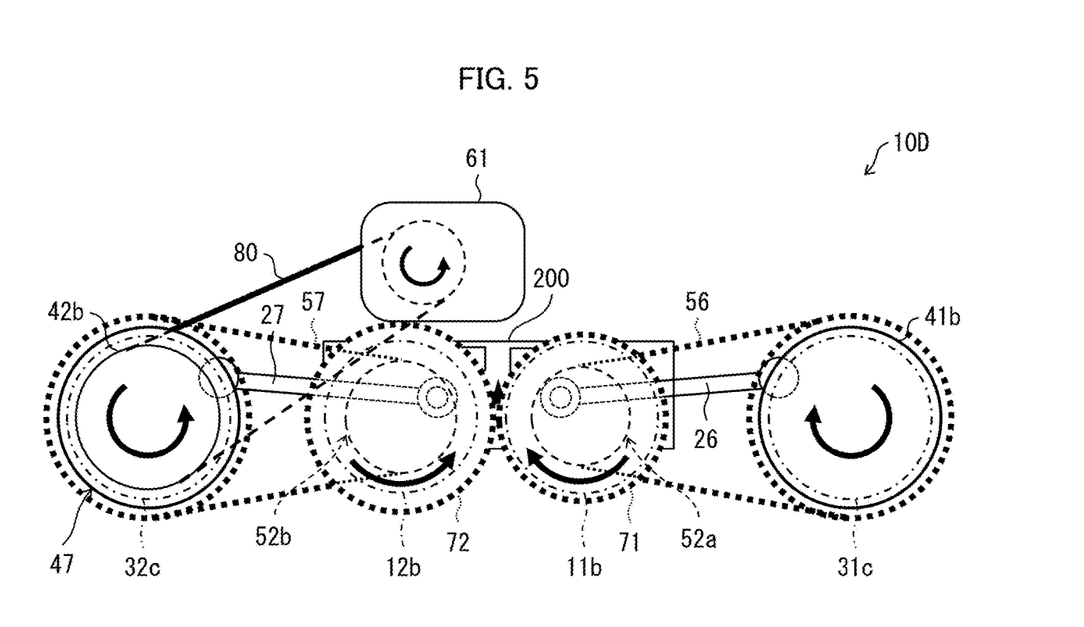
FIG. 5 is a lateral view schematically illustrating a configuration of a power generation device in accordance with Embodiment 4 of the present invention.

The following will discuss a configuration of the power generation device 10D in accordance with Embodiment 4 with reference to FIG. 5. FIG. 5 is a lateral view schematically illustrating a configuration of the power generation device 10D in accordance with Embodiment 4.

As illustrated in FIG. 5, the power generation device 10D includes the mechanical supercharger 61 connected to a left flywheel 42b via a step-up belt 80. The mechanical supercharger 61 rotates in a second rotation direction in conjunction with the left flywheel 42b at a speed increased at a third step-up ratio of a combination (a third power transmission section) of the left flywheel 42b, the step-up belt 80, and the mechanical supercharger 61.

A combination of the left flywheel 42b, a step-up chain 57, and a chain receiving section 52b will be referred to as a second power transmission section, and a combination of a right flywheel 41b, a step-up chain 56, and a chain receiving section 52a will be referred to as a first power transmission section.

In the power generation device 10D, a predetermined step-up ratio (a second step-up ratio) of the second power transmission section is smaller than a predetermined step-up ratio (a first step-up ratio) of the first power transmission section. Further, the power generation device 10D is configured such that sizes of the respective interlocking gears 71 and 72 and the numbers of teeth of the respective interlocking gears 71 and 72 are adjusted so as to allow a rotational frequency of the right crankshaft 31 and a rotational frequency of the left crankshaft 32 to be synchronized with each other. Specifically, the size and the number of teeth of the interlocking gear 71 are smaller than those of the interlocking gear 72.

With this, a rotational frequency of the power generation motor 12 is reduced so as to cope with addition of an inertia moment of the mechanical supercharger 61 to an inertia moment in the second rotation direction. This allows the power generation device 10D to achieve equality between a total inertia moment in the second rotation direction and a total inertia moment in the first rotation direction. That is, the power generation device 10D of Embodiment 4 satisfies a relationship represented by the following formula (4):

$$IRF + ng1 \times IG1 = ILF + ng2 \times IG2 + nsc \times ISC \tag{4}$$

where
IRF is an inertia moment of the right flywheel 41 which rotates in the first rotation direction;
ILF is an inertia moment of the left flywheel 42 which rotates in the second rotation direction;
IG1 is an inertia moment of the power generation motor 11 which rotates in the first rotation direction;
IG2 is an inertia moment of the power generation motor 12 which rotates in the second rotation direction;
ISC is the inertia moment of the mechanical supercharger 61 which rotates in the first rotation direction;
ng1 is the first step-up ratio of the first power transmission section;
ng2 is the second step-up ratio of the second power transmission section; and
nsc is the third step-up ratio of the third power transmission section.

Embodiment 5

The following description will discuss still another embodiment of the present invention. For convenience of description, members having the same functions as those of the members described in the above-described embodiments are denoted by the same reference numerals, and description thereof will not be repeated.

In Embodiments 1 through 4 described above, the power generation devices in accordance with aspects of the present invention were discussed. In Embodiment 5, the description will discuss an automobile in accordance with an aspect of the present invention which includes a power generation device.

Figure 6:
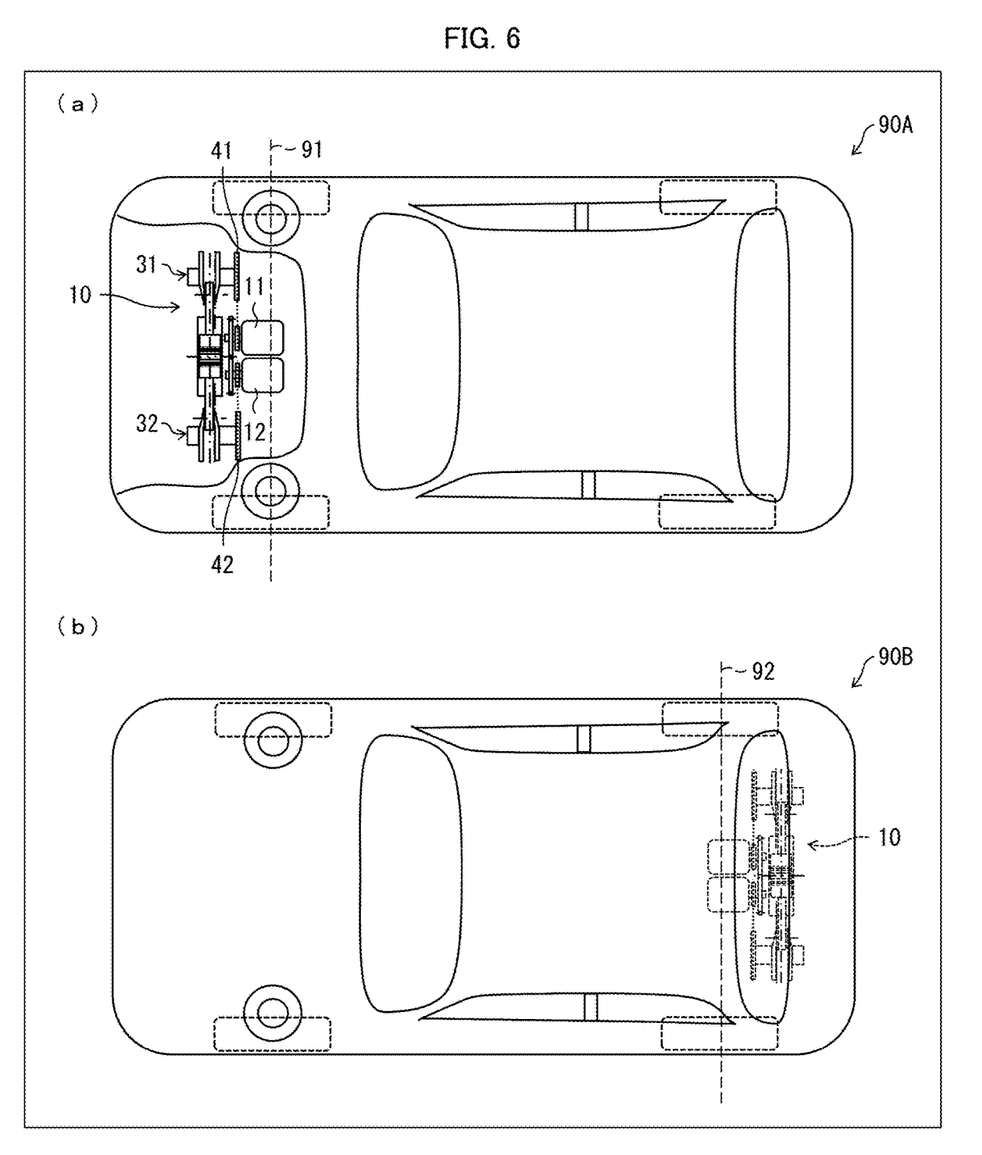

(a) of FIG. 6 is a plan view schematically illustrating a configuration of an automobile 90A, in which a power generation device 10 is provided, in accordance with Embodiment 5. (b) of FIG. 6 is a plan view illustrating a configuration of an automobile 90B as a variation.

The power generation device 10 is a power generation device in accordance with an aspect of the present invention, and may be, for example, any of the power generation devices 10A through 10D described above in Embodiments 1 through 4. Here, the power generation device 10 has the configuration of the power generation device 10C.

The automobile 90A can be, but not limited to, a hybrid car of the series hybrid technology. Alternatively, the automobile 90A may be an electric automobile including the power generation device 10.

Note that an engine 1 of the power generation device 10 is, in practice, combined with various accessories or the like (not illustrated) in order to be driven, and this combination constitutes an opposed-piston engine for electric power generation. In the present specification, a portion (the engines 1 illustrated in FIGS. 2 and 4) of the opposed-piston engine for electric power generation other than the various accessories may be referred to as a main body part of the piston engine.

As illustrated in (a) of FIG. 6, the automobile 90A includes the main body part of the piston engine in a position that is within a vehicle body and closer to a front side of the automobile 90A than an axis 91 of a front wheel. The power generation device 10 is arranged such that (i) a rotation axis of a right crankshaft 31 and a rotation axis of a left crankshaft 32 each extend in a direction parallel to an entire length of the automobile 90A. Further, the power generation device 10 is arranged such that (ii) a power generation motor 11 and a power generation motor 12 are provided on a side of the power generation device 10 which side faces a center of the automobile 90A.

As illustrated in (b) of FIG. 6, the automobile 90B includes the main body part of the piston engine in a position that is inside a vehicle body and closer to a rear side of the automobile 90B than an axis 92 of a rear wheel. The power generation device 10 is housed in the vehicle body of the automobile 90B in an orientation similar to the orientation described in (i) and (ii) above.

With the configurations above, it is possible to provide the automobile 90A and the automobile 90B in each of which the power generation device 10 including the engine 1 is compactly housed in the vehicle body.

The present invention is not limited to the embodiments but can be altered by a skilled person in the art within the scope of the claims. The present invention also encompasses, in its technical scope, any embodiment derived by combining technical means disclosed in differing embodiments.

Aspects of the present invention can also be expressed as follows:

In order to attain the object, a power generation device in accordance with an aspect of the present invention is a power generation device, including: a piston engine including a first piston, a second piston, a cylinder, a first crankshaft, and a second crankshaft, the first piston and the second piston reciprocating in the cylinder while facing each other, so that the first crankshaft rotates in a first rotation direction in accordance with the first piston and the second crankshaft rotates in a second rotation direction opposite to the first rotation direction in accordance with the second piston; a primary inertia body coupled to each of the first crankshaft and the second crankshaft; and a secondary inertia body which is connected to the primary inertia body via a power transmission section and rotates in conjunction with the primary inertia body at a speed increased at a basic step-up ratio of the power transmission section, the secondary inertia body including at least a power generator, a sum of an inertia moment of the primary inertia body and a product of an inertia moment of the secondary inertia body and the basic step-up ratio being defined to be a total inertia moment, a total inertia moment in the first rotation direction and a total inertia moment in the second rotation direction being balanced with each other by not less than 50%.

Further, a power generation device in accordance with an aspect of the present invention may be configured such that: the primary inertia body includes a first primary inertia body coupled to the first crankshaft and a second primary inertia body coupled to the second crankshaft; the secondary inertia body includes a first power generator and a second power generator which are provided so as to be adjacent to each other; the power transmission section includes a first power transmission section and a second power transmission section; the first power generator is connected to the first primary inertia body via the first power transmission section and rotates in the first rotation direction, and the second power generator is connected to the second primary inertia body via the second power transmission section and rotates in the second rotation direction; the first power generator includes a rotation shaft to which a first interlocking member is attached, and the second power generator includes a rotation shaft to which a second interlocking member is attached; and the first interlocking member and the second interlocking member engage with each other so that the first power generator and the second power generator rotate in opposite rotation directions to each other.

Further, a power generation device in accordance with an aspect of the present invention may be configured such that the first interlocking member and the second interlocking member which cause the first power generator and the second power generator to operate in conjunction with each other are each an anti-backlash gear.

Further, a power generation device in accordance with an aspect of the present invention may be configured such that: the first power transmission section includes a first power receiving section which is attached to the rotation shaft of the first power generator and receives power transmitted from the first crankshaft; the rotation shaft of the first power generator is provided with a phase variable member which causes a phase angle of the first interlocking member and a phase angle of the first power receiving section to change relative to each other; and a phase relationship between the first crankshaft and the second crankshaft is variable.

Further, a power generation device in accordance with an aspect of the present invention may be configured such that: the secondary inertia body further includes a mechanical supercharger; the power transmission section further includes a third power transmission section; the mechanical supercharger is connected to the second primary inertia body via the third power transmission section and rotates in the second rotation direction in conjunction with the second primary inertia body at a speed increased at a third step-up ratio of the third power transmission section; the second power transmission section has a second step-up ratio smaller than a first step-up ratio of the first power transmission section; and the first interlocking member and the second interlocking member have respective rotational speeds which are adjusted on the basis of the first step-up ratio and the second step-up ratio so that a rotational speed of the first power generator and a rotational speed of the second power generator are synchronized with each other.

Further, a power generation device in accordance with an aspect of the present invention may be configured such that: the primary inertia body includes a first primary inertia body coupled to the first crankshaft and a second primary inertia body coupled to the second crankshaft; the secondary inertia body includes a first power generator and a mechanical supercharger; the power transmission section includes a first power transmission section, a second power transmission section, and a third power transmission section; the first power generator is connected to the first primary inertia body via the first power transmission section and to the second primary inertia body via the second power transmission section and rotates in the second rotation direction at a speed increased at a first step-up ratio of the first power transmission section and at a second step-up ratio of the second power transmission section, the second step-up ratio being identical to the first step-up ratio; and the mechanical supercharger is connected to the first primary inertia body via the third power transmission section and rotates in the first rotation direction in conjunction with the first primary inertia body at a speed increased at a third step-up ratio of the third power transmission section.

Further, a power generation device in accordance with an aspect of the present invention may be configured such that: the first primary inertia body has an inertia moment greater than that of the second primary inertia body; and a product of the inertia moment of the first power generator and the first step-up ratio or the second step-up ratio is greater than a product of an inertia moment of the mechanical supercharger and the third step-up ratio.

An automobile in accordance with an aspect of the present invention is an automobile in which the power generation device is provided, wherein the power generation device is arranged such that: a main body part of the piston engine is provided in a position closer to a front side of the automobile than an axis of a front wheel of the automobile or a position closer to a rear side of the automobile than an axis of a rear wheel of the automobile; and (i) a rotation axis of the first crankshaft and a rotation axis of the second crankshaft each extend in a direction parallel to an entire length of the automobile and (ii) the power generator is provided on a side of the power generation device which side faces a center of the automobile.

REFERENCE SIGNS LIST

1: engine (piston engine)
2: power generation motor (power generator)
10, 10A through 10D: power generation device
21: first piston
22: second piston
20: cylinder
31: right crankshaft (first crankshaft)
32: left crankshaft (second crankshaft)
41: right flywheel (primary inertia body)
42: left flywheel (primary inertia body)
52a: chain receiving section (first power receiving section)
61: mechanical supercharger
71: interlocking gear (first interlocking member)
72: interlocking gear (second interlocking member)
75: phase variable member

The invention claimed is:

1. A power generation device, comprising:
a piston engine including a first piston, a second piston, a cylinder, a first crankshaft, and a second crankshaft, the first piston and the second piston reciprocating in the cylinder while facing each other, so that the first crankshaft rotates in a first rotation direction in accordance with the first piston and the second crankshaft rotates in a second rotation direction opposite to the first rotation direction in accordance with the second piston;
primary inertia bodies at least one of which is coaxially coupled to the first crankshaft and at least one of which is coaxially coupled to the second crankshaft; and
a secondary inertia body which is connected to each of the primary inertia bodies via a corresponding one of power transmission sections and rotates in conjunction with the primary inertia bodies at a speed increased at a basic step-up ratio of the power transmission sections,
the secondary inertia body including at least a power generator,
a total inertia moment is a sum of an inertia moment of the at least one of the primary inertia bodies and a product of an inertia moment of the secondary inertia body and the basic step-up ratio,
a total inertia moment in the first rotation direction and a total inertia moment in the second rotation direction being balanced with each other by not less than 50%.

2. The power generation device as set forth in claim 1, wherein:
the primary inertia bodies include a first primary inertia body coupled to the first crankshaft and a second primary inertia body coupled to the second crankshaft;
the secondary inertia body includes a first power generator and a second power generator which are provided so as to be adjacent to each other;
the power transmission sections include a first power transmission section and a second power transmission section;
the first power generator is connected to the first primary inertia body via the first power transmission section and rotates in the first rotation direction, and the second power generator is connected to the second primary inertia body via the second power transmission section and rotates in the second rotation direction;
the first power generator includes a rotation shaft to which a first interlocking member is attached, and the second power generator includes a rotation shaft to which a second interlocking member is attached; and
the first interlocking member and the second interlocking member engage with each other so that the first power generator and the second power generator rotate in opposite rotation directions to each other.

3. The power generation device as set forth in claim 2, wherein the first interlocking member and the second interlocking member which cause the first power generator and the second power generator to operate in conjunction with each other are each an anti-backlash gear.

4. The power generation device as set forth in claim 2, wherein:
the first power transmission section includes a first power receiving section which is attached to the rotation shaft of the first power generator and receives power transmitted from the first crankshaft;
the rotation shaft of the first power generator is provided with a phase variable member which causes a phase angle of the first interlocking member and a phase angle of the first power receiving section to change relative to each other; and a phase relationship between the first crankshaft and the second crankshaft is variable.

5. The power generation device as set forth in claim 2, wherein:

the secondary inertia body further includes a mechanical supercharger;

the power transmission sections further include a third power transmission section;

the mechanical supercharger is connected to the second primary inertia body via the third power transmission section and rotates in the second rotation direction in conjunction with the second primary inertia body at a speed increased at a third step-up ratio of the third power transmission section;

the second power transmission section has a second step-up ratio smaller than a first step-up ratio of the first power transmission section; and the first interlocking member and the second interlocking member have respective rotational speeds which are adjusted on the basis of the first step-up ratio and the second step-up ratio so that a rotational speed of the first power generator and a rotational speed of the second power generator are synchronized with each other.

6. The power generation device as set forth in claim 1, wherein:

the primary inertia bodies include a first primary inertia body coupled to the first crankshaft and a second primary inertia body coupled to the second crankshaft;

the secondary inertia body includes a first power generator and a mechanical supercharger;

the power transmission sections include a first power transmission section, a second power transmission section, and a third power transmission section;

the first power generator is connected to the first primary inertia body via the first power transmission section and to the second primary inertia body via the second power transmission section and rotates in the second rotation direction at a speed increased at a first step-up ratio of the first power transmission section and at a second step-up ratio of the second power transmission section, the second step-up ratio being identical to the first step-up ratio; and the mechanical supercharger is connected to the first primary inertia body via the third power transmission section and rotates in the first rotation direction in conjunction with the first primary inertia body at a speed increased at a third step-up ratio of the third power transmission section.

7. The power generation device as set forth in claim 6, wherein:

the first primary inertia body has an inertia moment greater than that of the second primary inertia body; and a product of the inertia moment of the first power generator and the first step-up ratio or the second step-up ratio is greater than a product of an inertia moment of the mechanical supercharger and the third step-up ratio.

8. An automobile in which a power generation device recited in claim 1 is provided, wherein the power generation device is arranged such that:

a main body part of the piston engine is provided in a position closer to a front side of the automobile than an axis of a front wheel of the automobile or a position closer to a rear side of the automobile than an axis of a rear wheel of the automobile; and (i) a rotation axis of the first crankshaft and a rotation axis of the second crankshaft each extend in a direction parallel to an entire length of the automobile and (ii) the power generator is provided on a side of the power generation device which side faces a center of the automobile.

* * * * *